United States Patent
Chen et al.

(10) Patent No.: US 9,156,368 B2
(45) Date of Patent: Oct. 13, 2015

(54) METHOD FOR DETECTION OF PLUG-IN ELECTRIC VEHICLE CHARGING VIA INTERROGATION OF SMART METER DATA

(75) Inventors: Chris Chen, Carlsbad, CA (US); William Vincent Torre, Chula Vista, CA (US); Charles Lyle, Fallbrook, CA (US); Benjamin L. Colson, San Marcos, CA (US); Eric S. Fan, San Diego, CA (US); Praneet Kolluru, San Diego, CA (US)

(73) Assignee: SAN DIEGO GAS & ELECTRIC COMPANY, San Diego, CA (US)

( * ) Notice: Subject to any disclaimer, the term of this patent is extended or adjusted under 35 U.S.C. 154(b) by 510 days.

(21) Appl. No.: 13/294,976

(22) Filed: Nov. 11, 2011

(65) Prior Publication Data
US 2012/0123709 A1     May 17, 2012

(51) Int. Cl.
*G01R 21/00* (2006.01)
*G06F 19/00* (2011.01)
*B60L 11/18* (2006.01)

(52) U.S. Cl.
CPC .......... *B60L 11/1848* (2013.01); *Y02T 10/7005* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC .......................... G01R 21/133; B60L 11/1848
USPC ........................................................... 702/60
See application file for complete search history.

(56) References Cited

U.S. PATENT DOCUMENTS

| | | | |
|---|---|---|---|
| 2010/0039062 A1 | 2/2010 | Gu et al. | |
| 2010/0045232 A1* | 2/2010 | Chen et al. | 320/109 |
| 2010/0082464 A1 | 4/2010 | Keefe | |
| 2010/0145885 A1* | 6/2010 | Graziano et al. | 705/412 |
| 2011/0029144 A1 | 2/2011 | Muller et al. | |
| 2011/0144823 A1 | 6/2011 | Muller et al. | |
| 2011/0172837 A1 | 7/2011 | Forbes, Jr. | |
| 2011/0175569 A1* | 7/2011 | Austin | 320/109 |
| 2011/0202189 A1 | 8/2011 | Venkatakrishnan et al. | |

OTHER PUBLICATIONS

Patent Cooperation Treaty, International Search Report for PCT/US2012/064233, Dec. 18, 2012, pp. 1-3.

* cited by examiner

*Primary Examiner* — Patrick Assouad
*Assistant Examiner* — Haidong Zhang
(74) *Attorney, Agent, or Firm* — Sheppard Mullin Richter & Hampton LLP (57) ABSTRACT

A method and application that utilizes a signal processing algorithm is provided for detecting plug-in electric vehicle charging events through interrogation of smart meter data. The method is a form of non-invasive load monitoring that allows the utility to track plug-in electric vehicle charging events in real time or over extended periods. These parameters are suitably flexible so as to accommodate diverse electric vehicle technologies and a range of electric vehicle owners' charging habits. Application of the method facilitates the integration of electric vehicles into utilities' electrical grids, protection of the utilities' assets, geographic mapping of electric vehicle owners and charging events, managed charging through communication between the utility and the vehicle or owner, managed charging through the offer of time of use rates for electric vehicle owners, and an enabling technology to accompany other Smart Grid functions such as Vehicle-to-Grid distributed energy storage.

20 Claims, 5 Drawing Sheets

| Key | ID_MTR_KEY | EventCount | Rate | Sheet |
|---|---|---|---|---|
| • | 1983364 | 18 | 0.600 | 6 |
| × | 1983331 | 17 | 0.567 | 12 |
| × | 1983397 | 17 | 0.567 | 11 |
| • | 1983399 | 17 | 0.567 | 11 |
| • | 1983304 | 16 | 0.533 | 15 |
| • | 1983330 | 16 | 0.533 | 13 |
| • | 1983332 | 16 | 0.533 | 12 |
| • | 1983491 | 16 | 0.533 | 7 |
| × | 1983493 | 15 | 0.500 | 15 |
| × | 1983518 | 15 | 0.500 | 3 |
| × | 1983191 | 14 | 0.467 | 17 |
| • | 1983194 | 14 | 0.467 | 17 |
| × | 1983228 | 14 | > 0.2 Events/day | |
| • | 1983262 | 14 | | |
| × | 1983329 | 14 | | |
| × | 1983490 | 14 | | |
| • | 1968951 | 13 | 0.433 | 2 |
| × | 1983197 | 12 | 0.400 | 2 |
| • | 1799761 | 11 | 0.367 | 20 |
| • | 1960692 | 11 | 0.367 | 14 |
| × | 1978107 | 11 | 0.367 | 20 |
| × | 1983313 | 11 | 0.367 | 14 |
| • | 1983337 | 11 | 0.367 | 10 |
| • | 1983419 | 11 | 0.367 | 19 |
| • | 1930924 | 10 | 0.333 | 21 |
| • | 1983351 | 9 | 0.300 | 5 |
| × | 1983418 | 9 | 0.300 | 19 |
| • | 1983517 | 9 | 0.300 | 3 |
| × | 1978132 | 8 | 0.267 | 21 |
| • | 1983434 | 8 | 0.267 | 18 |

|   |   | Ⓐ |   | Ⓑ |
|---|---|---|---|---|
| × | 1983362 | 7 | 0.233 | 6 |
| × | 1983349 | 6 | 0.200 | 5 |
| × | 1983353 | 6 | 0.200 | 8 |
| • | 1983355 | 5 | 0.167 | 8 |
| + | 5666244 | 5 | 0.167 | |
| • | 1983240 | 3 | 0.100 | 9 |
| + | 5594125 | 3 | 0.100 | |
| + | 5662370 | 3 | 0.100 | |
| + | 5729345 | 3 | 0.100 | |
| + | 5055398 | 2 | 0.067 | |
| − | 5069632 | 2 | 0.067 | 15 |
| + | 5238676 | 2 | 0.067 | |
| + | 5358090 | 2 | 0.067 | |
| − | 1983338 | 1 | 0.033 | 10 |
| + | 5069635 | 1 | 0.033 | |
| + | 5092653 | 1 | 0.033 | |
| + | 5236968 | 1 | 0.033 | |
| + | 5307319 | 1 | 0.033 | |
| − | 5380475 | 1 | 0.033 | 20 |
| + | 5662372 | 1 | | |
| − | 5675683 | 1 | < 0.2 Events/day | |
| + | 5692690 | 1 | | |
| + | 5696267 | 1 | | |
| + | 6058671 | 1 | 0.033 | |
| + | 6091650 | 1 | 0.033 | |
| + | 6442312 | 1 | 0.033 | |

METHOD FOR DETECTION OF PLUG-IN ELECTRIC VEHICLE CHARGING VIA INTERROGATION OF SMART METER DATA

FIELD OF THE INVENTION

The present invention relates generally to plug-in electric vehicles, advanced metering infrastructure (smart meters), utility load analysis, and the generation, transmission and distribution infrastructure necessary to integrate these vehicles into utilities' existing electrical grids.

BACKGROUND OF THE INVENTION

There is an increasing interest in PEVs (plug-in electric vehicles), particularly with the introduction in 2011 of the Nissan Leaf and the Chevrolet Volt. The Nissan Leaf is a purely electric car that requires no gasoline and provides the consumer with a 100-mile driving range per charge. The Chevrolet Volt is a PHEV (plug-in hybrid electric vehicle) which extends its electric driving range with a gasoline generator. Owners can charge the Nissan Leaf and the Chevy Volt using either a 240V or 120V power supply. Charging at 240V requires a separate infrastructure (EVSE) that supplies electric energy for charging electric vehicles and plug-in hybrids, while 120V charging can be done from a regular house outlet.

Though the chargers are similar for all EVs, there are several differences between the battery sizes of various EVs. For example, the Leaf has a battery size of 24 kWh while the Volt battery is at 16 kWh. Fully charging a Leaf at 240V/16 A requires around 6.5 hours while charging at 3.7 kW, whereas fully charging a Volt at 240V/16 amps requires around 4 hours while charging at 3.7 kW. On the other hand, charging at 120V takes substantially, longer, as approximately 20 hours are required to fully charge the Leaf at 1.4 kW, while approximately 11.5 hours are requires to completely charge the Volt at 1.4 kW.

On average, a typical household draws 0.7 kWh of load from their local power utility. This might consist of typical household appliances such as washers, dryers, ovens, etc. However, the household load can change depending on several variables, notably weather related HVAC usage. There may also be luxury variables such as pools, spas and on-site PV (photovoltaic) generation. In contrast, an EV can draw up to 3.7 kW per hour. This presents a problem because one EV owner alone can indirectly add 4 households worth of load to a service transformer, which can place that transformer at risk of being seriously overloaded. Modern transformers can withstand a certain degree of overloading, however as the popularity and adoption of PEVs grows, the risk of multiple PEVs clustered on a single transformer will increase that risk. Moreover, the next generation of PEVs are poised to come out with bigger batteries that require higher kWh charging, further heightening the risk to, transformers.

When buying a PEV, the consumer has no obligation to inform the utility company of their purchase. As a result, some utility companies have initiated programs where customers can work with the utility to benefit from special power pricing structures, and utilities can be made aware of the additional load to their grid. For example, San Diego Gas and Electric (SDG&E) has participated in the federally funded EV Project; this project works with different utility companies to help provide new PEV customers with free 240V chargers. In addition, SDG&E has put most of these customers on special billing rates that incentivize owners to charge during off-peak hours. Knowing the location of the PEVs, SDG&E is then able to monitor load on the infrastructure that serves that customer. This situational awareness allows the utility to limit power interruptions and to preserve power quality. Additionally, knowing the location of electric vehicles facilitates programs such as demand response to shut off charging when the grid is under stress, and Smart Grid applications such as Vehicle-to-Grid distributed energy storage. As incentive programs such as these come to an end, it is increasingly difficult for utilities to keep track of the influx of PEVs to their grid. As such, it is incumbent upon the utilities to employ advanced methods of tracking electric vehicle charging.

BRIEF SUMMARY OF EMBODIMENTS OF THE INVENTION

The present invention is directed toward an algorithm that employs a specific logic structure to interrogate interval consumption data. In most utilities having an Advanced Metering Infrastructure (AMI), meter data is reported in either 15-minute or hourly intervals, and only kWh information is transmitted. Future versions of meter technology may allow for more densely sampled time intervals or other data such as voltage and current. Relying strictly on hourly interval reads and kWh data, the algorithm set forth herein scans through real-time or archival data sets to identify load signatures indicative of electric vehicle charging.

The algorithm relies on four parameters to identify charging events: 1) a threshold level of total kWh consumption; 2) a defined duration at which kWh consumption remains above this threshold; 3) a leading edge increase in kWh consumption; and 4) a lagging edge decrease in kWh consumption. The specific numeric value for each of these parameters is flexible and is determined as a function of several variables including, but not limited to: vehicle type, charging behavior to be monitored, time of year, climate zone, and presence of photovoltaic generation at the premise.

The accuracy with which the algorithm can discriminate between actual electric vehicle charging events and other electric loads is also a function of vehicle type and charging behavior. These factors lead the algorithm to be most useful for identifying premises that have installed EVSE hardware and where PEVs are routinely charged. However, it is anticipated that increasingly larger PEV batteries and faster charging will be the norm. Additionally, future AMI implementations are likely to have higher sampling rates. Both of these developments will improve the accuracy of real time monitoring and individual charging event identification based on this algorithm.

One embodiment of the invention involves a non-transitory computer readable medium having computer executable program code embodied thereon, the computer executable program code configured to cause a computing device to detect a PEV charging event at a residence through signal processing analysis of interval consumption data for the residence. The computer executable program code may further be configured to cause the computing device to detect a beginning, end, magnitude and/or duration of the charging event using a predetermined set of parameters.

In some embodiments of the above method, the predetermined set of parameters is selected to accommodate a particular model of PEV. According to further embodiments, the predetermined set of parameters is selected to accommodate various modes including DC fast charging of charging and associated EVSEs. In one implementation, the computer executable program code may further be configured to distinguish a PEV charging event from another load. Additionally, the computer executable program code is further configured to identify a PEV charging event as occurring either on-peak or off-peak. In further embodiments, the computer executable program code is further configured to identify the residence with PEV charging by a pattern of repeated charging.

According to various embodiments of the above method, the computer executable program code is further configured to assign a charging rate to the residence with PEV charging, wherein the charging rate is expressed as charging events per unit time. In some cases, the computer executable program code may further be configured to subject identified residences to probabilistic ranking to identify PEV owners. In some embodiments, the computer executable program code is further configured to subject identified residences to probabilistic ranking to identify PEV owners. In addition, the computer executable program code may further be configured to apply database query language to archival and/or real time data for retrospective analysis. In some embodiments, the computer executable program code can be further configured to convert resulting information to a GIS mapping of PEV events and owners.

The method of claim 15, wherein the computer executable program code is further configured to convert resulting information to a GIS mapping of PEV events and owners.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only, and merely depict typical or example embodiments of the invention. These drawings are provided to facilitate the reader's understanding of the invention and shall not be considered limiting of the breadth, scope, or applicability of the invention.

FIG. 5 is a diagram illustrating an example computing module for implementing various embodiments of the invention.

These figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a method and application that utilizes a signal processing algorithm for detecting plug-in electric vehicle charging events through interrogation of smart meter data. In one implementation, the method is a form of non-invasive load monitoring that allows the utility to track plug-in electric vehicle charging events in real time or over extended periods. The detection of charging events may involve an algorithm with parameters derived from thousands of previously observed charging events. These parameters are suitably flexible so as to accommodate diverse electric vehicle technologies and a range of electric vehicle owners' charging habits.

TERMS AND DEFINITIONS

As used herein, the term "Advanced Metering Infrastructure" (AMI) means a system comprising utility meters, communication networks and information technology systems which enable near real-time measurement of energy consumption and production, two-way communication between the meter and the utility, and remote control of meter functions.

As used herein, the term Plug-In Electric Vehicle (PEV) means a motor vehicle that can be charged from an external source of electricity, such as wall outlets or charging equipment made specifically for PEVs.

As used herein, the term Electric Load means an electric circuit connected to an output terminal. The load can also be referred to as the power consumed by a circuit.

As used herein, the term Non-Invasive Load Monitoring (NILM) means the process of analyzing changes in the voltage and current going into a building or residence and determining what appliances are used in the house as well as their individual power consumption.

As used herein, the term Load Disaggregation means the process of identifying the underlying components that contribute to a total power consumption profile for a building or residence.

As used herein, the term Time of Use Rate (TOU) means a pricing mechanism that sets electricity prices for a specific time period on a real-time, advance or forward basis.

As used herein, the term Geographic Information System (GIS) means a system designed to capture, store, manipulate, analyze, manage, and/or present all types of geographically referenced data.

As used herein, the term Electric Vehicle Supply Equipment (EVSE) means an infrastructure that supplies electric energy for charging electric vehicles and/or plug-in hybrid vehicles.

As used herein, the term Smart Meter means an electric meter that records consumption of electric energy in time intervals and communicates that information to the utility company providing the power.

As used herein, the term Interval Data Recorder (IDR) Meter means an electric meter that records energy consumptions in a shorter time interval compared to the Smart Meter.

As used herein, the term Vehicle-to-Grid (V2G) means a system in which plug-in electric vehicles communicate with the power grid to facilitate demand response services by either delivering electricity into the grid or by throttling their charging rate.

As used herein, the term PEV Charging Event means a single instance of a PEV being charged for any length of time.

As used herein, the term True Positive means a PEV charging event that is identified correctly as a PEV charging event, e.g., by the algorithm described below.

As used herein, the term False Positive means a power consumption profile that resembles a PEV charging event and is incorrectly identified as a PEV charging event, e.g., by the algorithm described below.

As used herein, the term False Negative means a PEV charging event that is not recognized (e.g., by the algorithm) due to fluctuations in the background load.

As used herein, the term Charging Event Rate means a frequency with which a PEV owner charges their vehicle, expressed as the number of PEV charging events per unit time.

As used herein, the term Leading Edge means a starting point of a PEV charging event.

As used herein, the term Lagging Edge means an ending point of a PEV charging event.

As used herein, the term HVAC means heating, ventilation and air conditioning

According to various embodiments of the invention, application of the method for detecting plug-in electric vehicle charging events facilitates: (i) the integration of electric vehicles into utilities' electrical grids, (ii) protection of the utilities' assets, (iii) geographic mapping of electric vehicle owners and charging events, (iv) managed charging through communication between the utility and the vehicle or owner, (v) managed charging through the offer of time of use rates for electric vehicle owners, and (vi) an enabling technology to accompany other Smart Grid functions such as Vehicle-to-Grid distributed energy storage.

Figure 1:
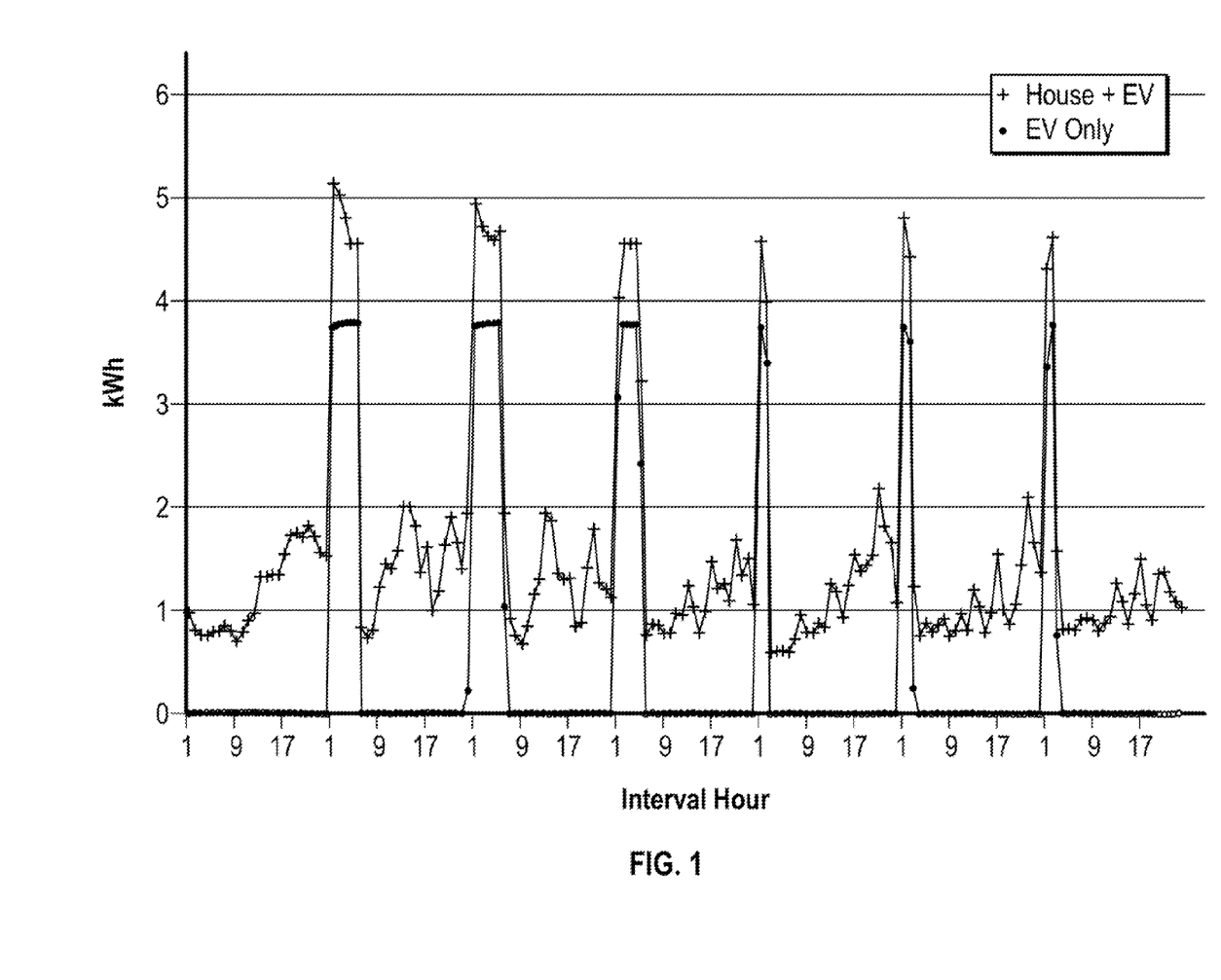
FIG. 1 is a chart showing whole house power consumption in kWh overlaid with PEV specific power consumption, in accordance with an embodiment of the present invention.

FIG. 1 is a chart showing whole house power consumption (meter interval data) in kWh overlaid with PEV specific power consumption, in accordance with an embodiment of the present invention. The owner of the house was a known Nissan Leaf owner and meter interval data was collected hourly for the period of one week. The chart demonstrates patterns indicative of PEV charging events. Data from a whole house meter ("+") that measures total kWh consumption (including the PEV) has prominent peaks above 4.0 kWh that last for multiple consecutive hours. These peaks are suspected PEV charging events and can be confirmed by overlaying data from a dedicated submeter (".") that only measures PEV power consumption.

Figure 2:
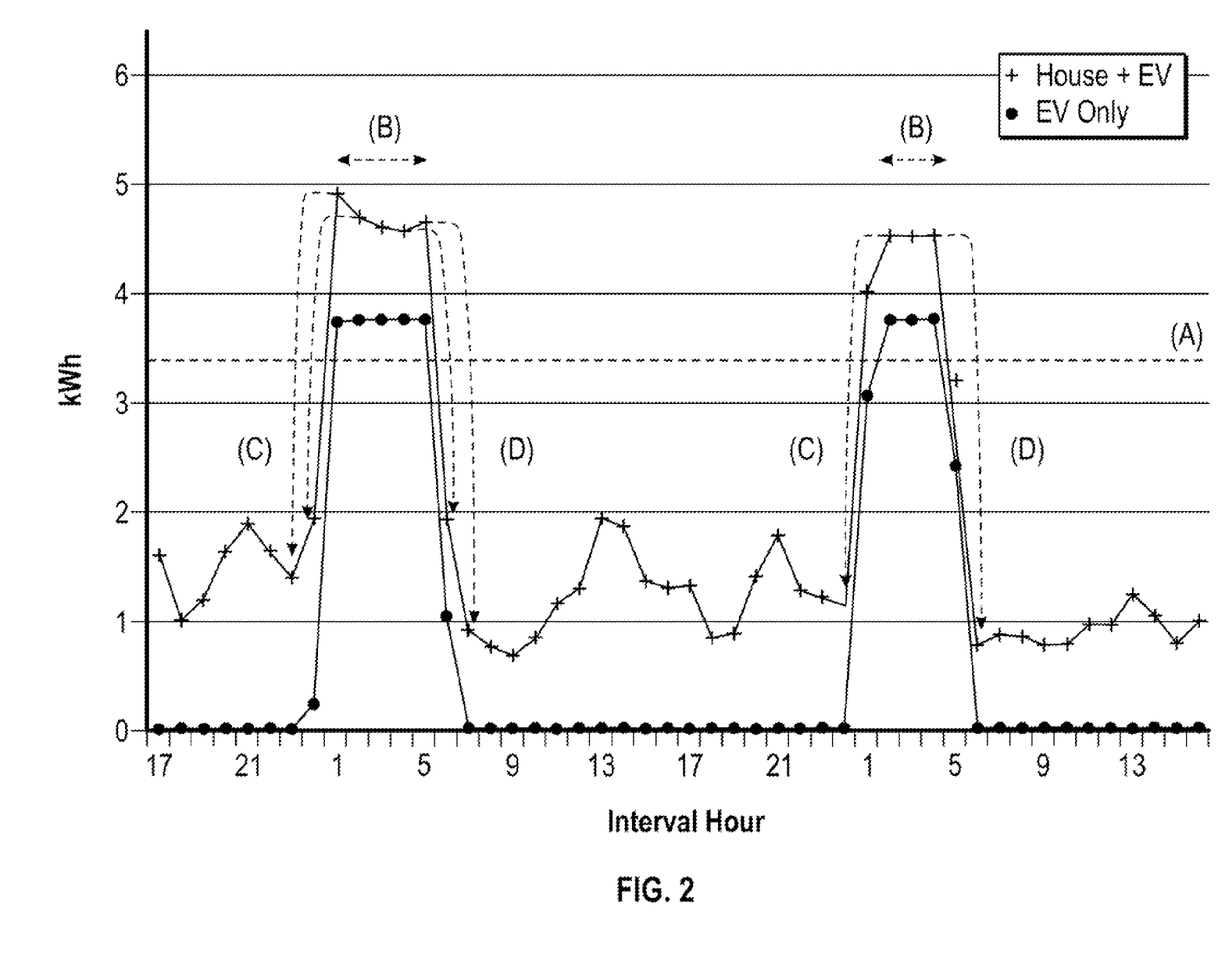
FIG. 2 is a chart illustrating the anatomy of a PEV charging event, in accordance with an embodiment of the present invention.

To identify the charging events of a Nissan Leaf at a premise that lacks a dedicated PEV submeter, the four parameters of the algorithm can be set to specific values optimized for interrogation of whole house meters. FIG. 2 is a chart illustrating the anatomy of a PEV charging event, in accordance with an embodiment of the present invention. Specifically, the chart is a plot of two individual charging events with whole house power consumption in kWh ("+") overlaid with PEV specific power consumption ("."). The parameters for charging event detection include: (A) Threshold, (B) Duration, (C) Leading Edge, and (D) Lagging Edge. These parameters are depicted in FIG. 2.

In some embodiments the Threshold parameter requires that total power consumption including the EV must exceed 3.5 kWH, while the Duration parameter requires that total power consumption remain above this Threshold for no less than 2 hours and no more than 5 hours. In addition, the Leading Edge parameter may require that the total power consumption rise by no less than 2.9 kWh between interval n and interval n+2, whereas the Lagging Edge parameter may require that the total power consumption fall by no less than 3.1 kWh between two subsequent intervals n and n+2.

Figure 3A:
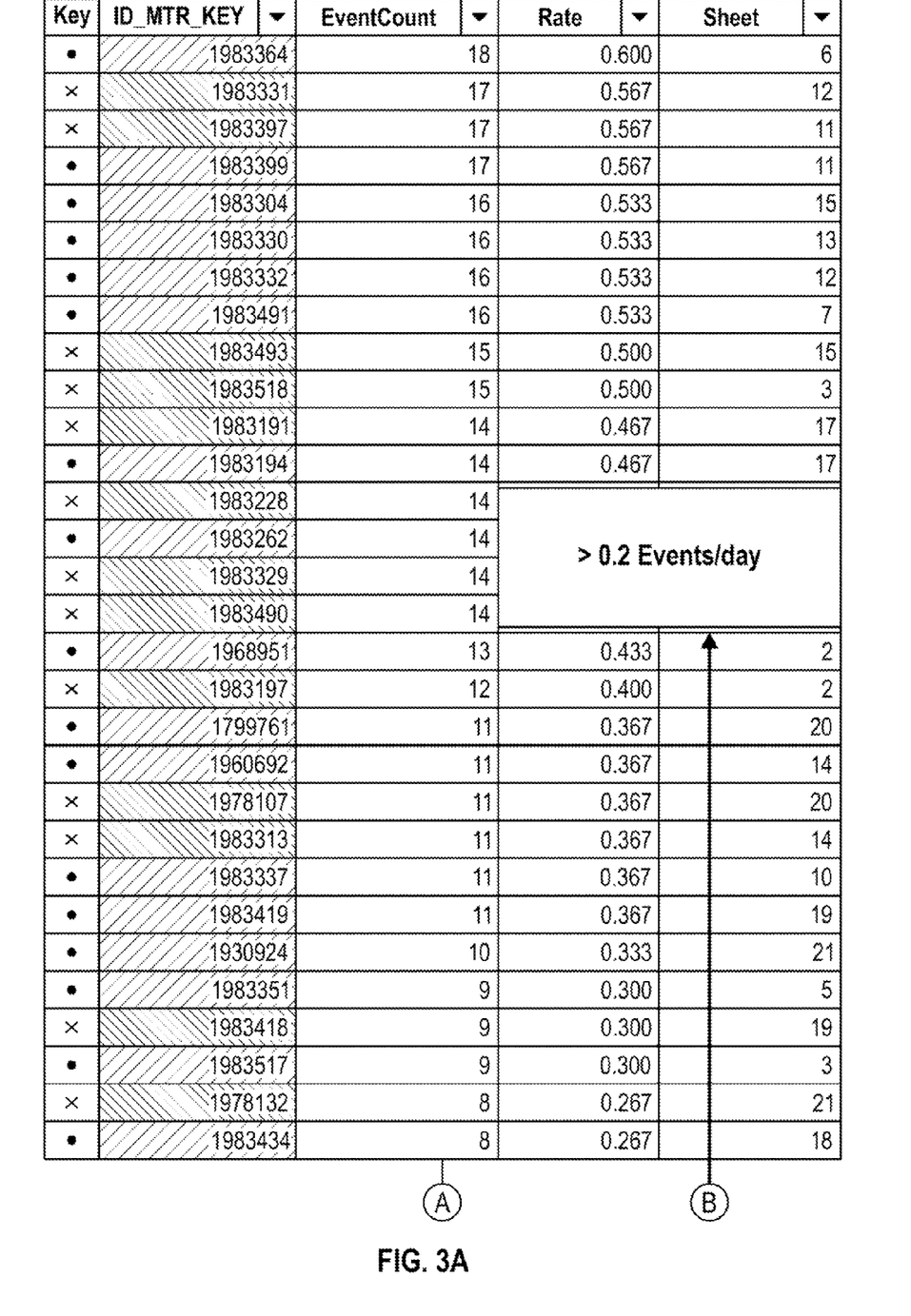
FIG. 3 is a table of charging event rates, in accordance with an embodiment of the present invention.
Figure 3B:
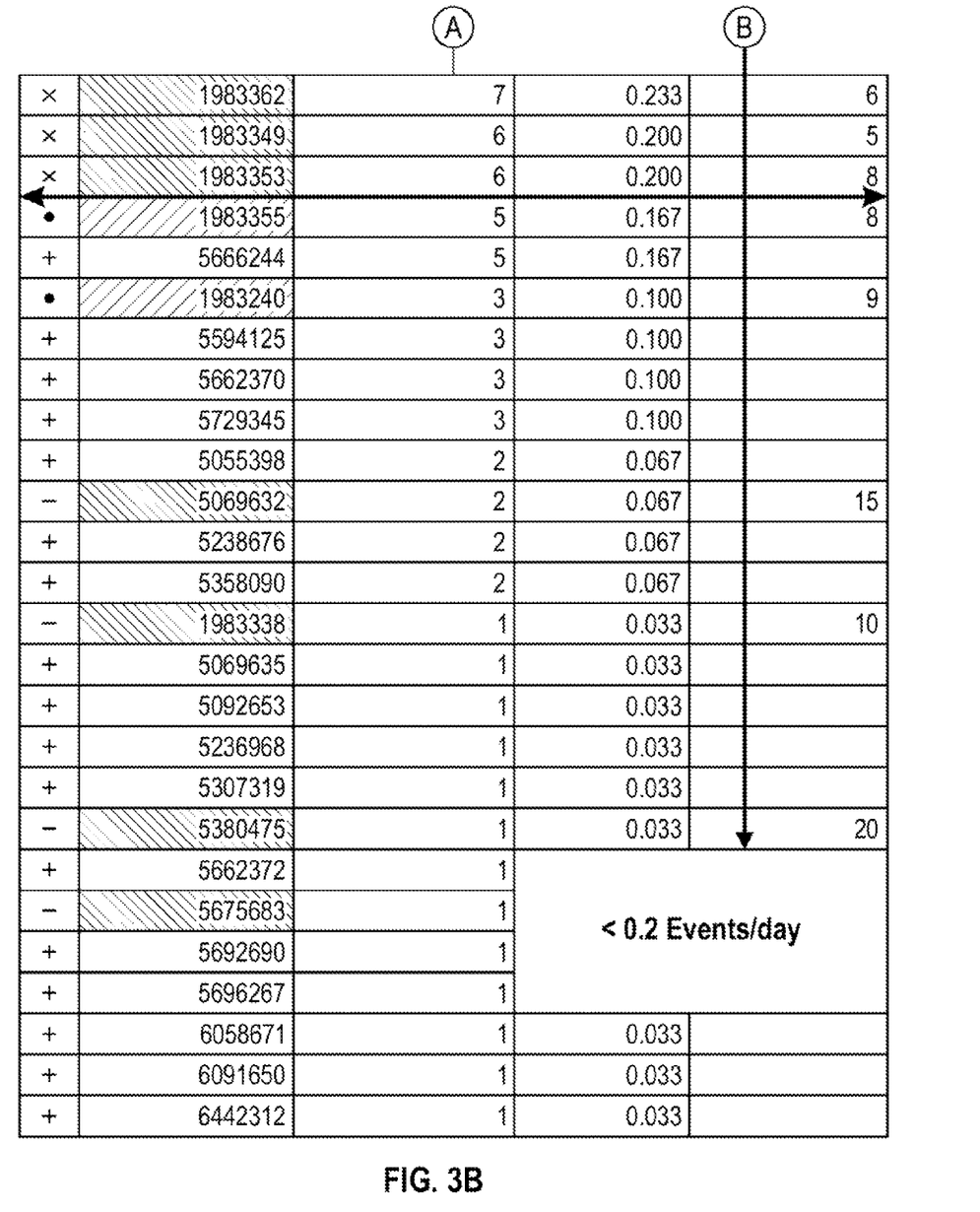

To identify a premise that has an EVSE installed and where PEVs are routinely charged, meter data is observed for a period of time. From observation of known Nissan Leaf owners, it was demonstrated that these premises experience a minimum number of charging events per unit time, expressed as events per day. Setting a threshold for minimum events per day of 0.2 allows for nearly complete discrimination of PEV owners from Non-Owners. FIG. 3 is a table of charging event rates, in accordance with an embodiment of the present invention. PEV owners (indicated with an "X" or "·" next to the meter number) have rates greater than 0.2 events per day. Non-Owners (indicated with a "+" or "−" next to the meter number) have rates less than 0.2 events per day. Further metrics are applied that eliminate highly consistent charging durations indicative of loads that are not truly PEVs. A series of metrics including, but not limited to geography, demographics and false positive rates, may also be employed to rank the probability of any candidate owner identified by the algorithm.

Figure 4:
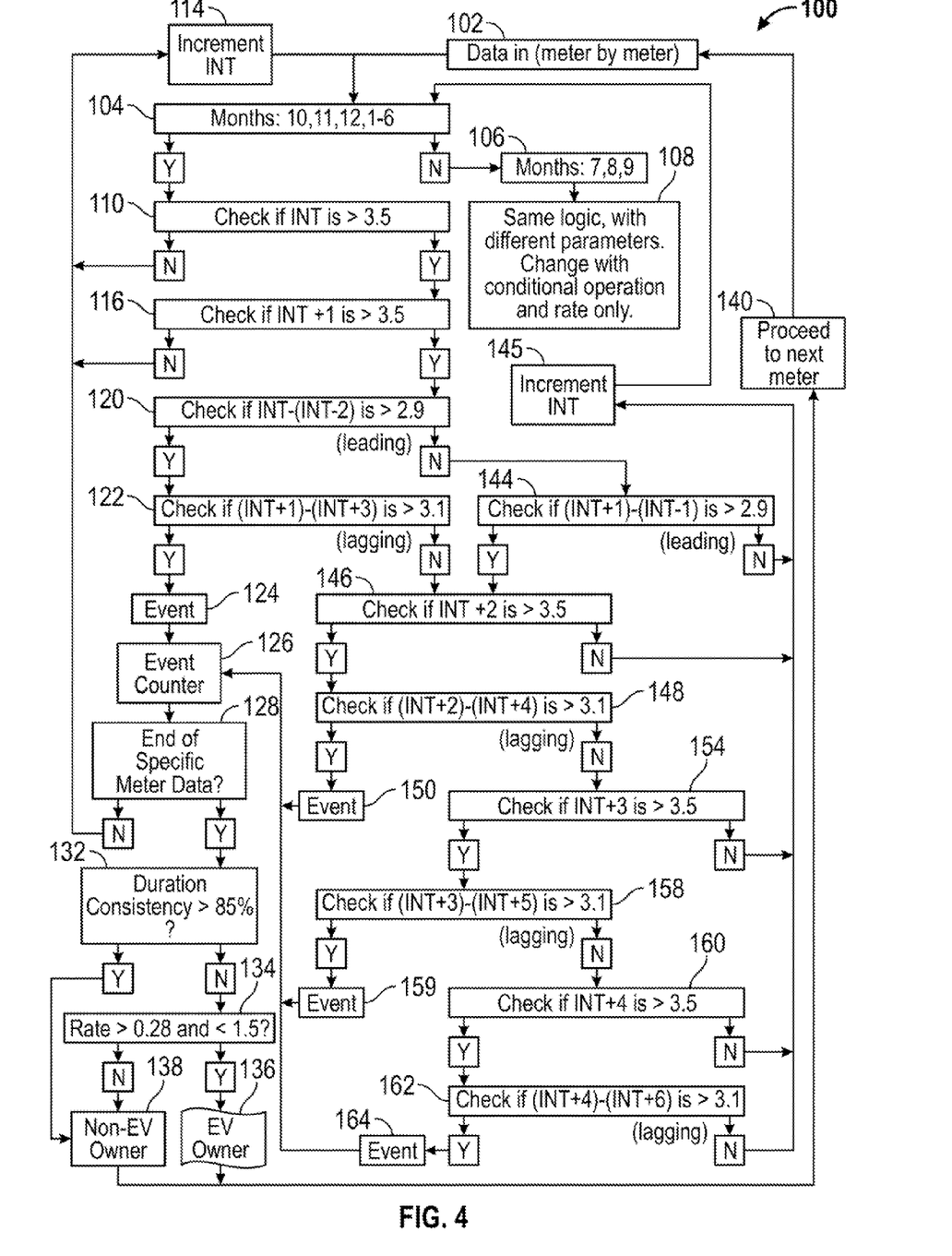
FIG. 4 is a flowchart of an algorithmic logic structure for interval data by individual meter, in accordance with an embodiment of the present invention.

An algorithmic logic structure was constructed that allows the writing of standard query logic (SQL) or other query language that may be used to interrogate large data sets in either a real-time or archival fashion. FIG. 4 is a flowchart 100 of the algorithmic logic structure for interval data by individual meter, in accordance with an embodiment of the present invention. Specifically, interval data by individual meter enters at operation 102. Operation 104 involves determining whether the data is from the month of January, February, March, April, May, June, October, November or December. If not, the method proceeds to operation 106 indicating the data is from July, August or September, and the same logic is applied, but using different parameters (operation 108).

If operation 104 is answered with a "yes," the method proceeds to operation 110, which checks whether the interval (INT) is greater than 3.5. If not, the interval is increased in operation 114 and the method proceeds again to operation 104. If so, the method proceeds to operation 116, which checks whether INT+1>3.5. If not, the interval is increased in operation 114 and the method proceeds again to operation 104. If so, the method proceeds to operation 120, which checks whether INT−(INT−2)>2.9. If not, the method proceeds to operation 144. If so, the method proceeds to operation 122, which checks whether (INT+1)−(INT+3)>3.1. If so, an event has occurred at operation 124 and an event counter records the event at operation 126.

With further reference to FIG. 4, operation 128 involves determining whether this is the end of specific meter data for this individual meter. If not, the method proceeds to operation 114 and the interval is incremented. If so, the method proceeds to operation 132, which determines whether duration consistency is greater than 85%. If not, the method proceeds to operation 134, which determines whether the charging event rate is greater than 0.28 and less than 1.5. If so, the algorithm determines the presence of an electric vehicle owner (operation 136). However, if operation 132 determines than duration consistency is not greater than 85%, or if operation 134 determines that the charging event rate is not greater than 0.28 or is not less than 1.5, then the algorithm determines that the household does not include an electric vehicle owner (operation 138).

Operation 144 involves determining whether (INT+1)−(INT−1)>2.9. If not, the method proceeds to operation 145 and the interval is incremented. If so, the method proceeds to operation 146, which checks whether INT+2>3.1. If not, the method proceeds to operation 145 and the interval is incremented. If so, the method proceeds to operation 148, which checks whether (INT+2)−(INT+4)>3.1. If so, an event has occurred at operation 150 and the event counter records the event at operation 126. If not, the algorithm proceeds to operation 154, which determines whether INT+3>3.5. If not, the method proceeds to operation 145 and the interval is incremented. If so, the method proceeds to operation 158, which checks whether (INT+3)−(INT+5)>3.1. If so, an event has occurred at operation 159 and the event counter records the event at operation 126. If not, the algorithm proceeds to operation 160, which determines whether INT+4>3.5. If not, the method proceeds to operation 145 and the interval is incremented. If so, the method proceeds to operation 162, which checks whether (INT+4)−(INT+6)>3.1. If not, the method proceeds to operation 145 and the interval is incremented. If so, an event has occurred at operation 164 and the event counter records the event at operation 126.

In summary, the algorithm queries interval data to determine when charging events occur (i.e., at operations . . . ). The algorithm outputs PEV owners (at operation . . . ) based on charging rates, i.e. events per unit time. Though the values for each parameter in this example are set to detect charging of a Nissan Leaf, they can be changed to search for other vehicle types (present or future) or other charging behaviors without departing from the scope of the present invention.

As used herein, the term "set" may refer to any collection of elements, whether finite or infinite. The term "subset" may refer to any collection of elements, wherein the elements are taken from a parent set; a subset may be the entire parent set. The term "proper subset" refers to a subset containing fewer elements than the parent set. The term "sequence" may refer to an ordered set or subset. The terms "less than," "less than or equal to," "greater than," and "greater than or equal to," may be used herein to describe the relations between various objects or members of ordered sets or sequences; these terms will be understood to refer to any appropriate ordering relation applicable to the objects being ordered.

The term "tool" can be used to refer to any apparatus configured to perform a recited function. For example, tools can include a collection of one or more modules and can also be comprised of hardware, software or a combination thereof. Thus, for example, a tool can be a collection of one or more software modules, hardware modules, software/hardware modules or any combination or permutation thereof. As another example, a tool can be a computing device or other appliance on which software runs or in which hardware is implemented.

As used herein, the term "module" might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 4. Various embodiments are described in terms of this example-computing module 1000. After reading this description, it will become apparent to a person skilled in the relevant art how to implement the invention using other computing modules or architectures.

Referring now to FIG. 5, computing module 1000 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1000 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1000 might include, for example, one or more processors, controllers, control modules, or other processing devices, such as a processor 1004. Processor 1004 might be implemented using a general-purpose or special-purpose processing engine such as, for example, a microprocessor, controller, or other control logic. In the illustrated example, processor 1004 is connected to a bus 1003, although any communication medium can be used to facilitate interaction with other components of computing module 1000 or to communicate externally.

Computing module 1000 might also include one or more memory modules, simply referred to herein as main memory 1008. For example, preferably random access memory (RAM) or other dynamic memory, might be used for storing information and instructions to be executed by processor 1004. Main memory 1008 might also be used for storing temporary variables or other intermediate information during execution of instructions to be executed by processor 1004. Computing module 1000 might likewise include a read only memory ("ROM") or other static storage device coupled to bus 1003 for storing static information and instructions for processor 1004.

The computing module 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a floppy disk drive, a magnetic tape drive, an optical disk drive, a CD, DVD or Blu-ray drive (R or RW), or other removable or fixed media drive might be provided. Accordingly, storage media 1014 might include, for example, a hard disk, a floppy disk, magnetic tape, cartridge, optical disk, a CD, DVD or Blu-ray, or other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing module 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory module) and memory slot, a PCMCIA slot and card, and other fixed or removable storage units 1022 and interfaces 1020 that allow software and data to be transferred from the storage unit 1022 to computing module 1000.

Computing module 1000 might also include a communications interface 1024. Communications interface 1024 might be used to allow software and data to be transferred between computing module 1000 and external devices. Examples of communications interface 1024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1024 might typically be carried on signals, which can be electronic, electromagnetic (which includes optical) or other signals capable of being exchanged by a given communications interface 1024. These signals might be provided to communications interface 1024 via a channel 1028. This channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1008, storage unit 1020, media 1014, and channel 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1000 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A non-transitory computer readable medium having computer executable program code embodied thereon, the computer executable program code configured to cause a computing device to:
    monitor a residence over time for the presence of individual charging events;
    detect an individual charging event at the residence and identify it as a plug-in electric vehicle charging event through signal processing analysis of interval consumption data for the residence based on a threshold level of total kWh consumption, a defined duration at which kWh consumption remains above this threshold, a leading edge increase in kWh consumption, and a lagging edge decrease in kWh consumption.

2. The non-transitory computer readable medium of claim 1, wherein the computer executable program code is further configured to cause the computing device to detect a beginning and an end of the charging event using a predetermined set of parameters.

3. The non-transitory computer readable medium of claim 1, wherein the computer executable program code is further configured to cause the computing device to detect a magnitude and a duration of the charging event.

4. The non-transitory computer readable medium of claim 2, wherein the predetermined set of parameters is selected to accommodate a particular model of plug-in electric vehicle.

5. The non-transitory computer readable medium of claim 2, wherein the predetermined set of parameters is selected to accommodate a particular model of plug-in electric vehicle.

6. The non-transitory computer readable medium of claim 2, wherein the predetermined set of parameters is selected to accommodate various modes including DC fast charging of charging and associated electric vehicle supply equipment.

7. The non-transitory computer readable medium of claim 2, wherein the predetermined set of parameters is selected to accommodate various modes including DC fast charging of charging and associated electric vehicle supply equipment.

8. The non-transitory computer readable medium of claim 2, wherein the computer executable program code is further configured to a plug-in electric vehicle charging event from another load.

9. The non-transitory computer readable medium of claim 3, wherein the computer executable program code is further configured to distinguish a plug-in electric vehicle charging event from another load.

10. The non-transitory computer readable medium of claim 2, wherein the computer executable program code is further configured to identify a plug-in electric vehicle charging event as occurring either on-peak or off-peak.

11. The non-transitory computer readable medium of claim 3, wherein the computer executable program code is further configured to identify a plug-in electric vehicle charging event as occurring either on-peak or off-peak.

12. The non-transitory computer readable medium of claim 2, wherein the computer executable program code is further configured to identify the residence with plug-in electric vehicle charging by a pattern of repeated charging.

13. The non-transitory computer readable medium of claim 3, wherein the computer executable program code is further configured to identify the residence with plug-in electric vehicle charging by a pattern of repeated charging.

14. The non-transitory computer readable medium of claim 2, wherein the computer executable program code is further configured to assign a charging rate to the residence with plug-in electric vehicle charging, wherein the charging rate is expressed as charging events per unit time.

15. The non-transitory computer readable medium of claim 3, wherein the computer executable program code is further configured to assign a charging rate to the residence with plug-in electric vehicle charging, wherein the charging rate is expressed as charging events per unit time.

16. The non-transitory computer readable medium of claim 2, wherein the computer executable program code is further configured to subject identified residences to probabilistic ranking to identify plug-in electric vehicle owners.

17. The non-transitory computer readable medium of claim 3, wherein the computer executable program code is further configured to subject identified residences to probabilistic ranking to identify plug-in electric vehicle owners.

18. The non-transitory computer readable medium of claim 6, wherein the computer executable program code is further configured to subject identified residences to probabilistic ranking to identify plug-in electric vehicle owners.

19. The non-transitory computer readable medium of claim 6, wherein the computer executable program code is further configured to apply database query language to archival data for retrospective analysis and to real time data to create situational awareness.

20. The non-transitory computer readable medium of claim 7, wherein the computer executable program code is further configured to convert resulting information to a geographic information system mapping of plug-in electric vehicle events and owners.

* * * * *